United States Patent [19]

Galindez (Aldecoa)

[11] 4,210,434
[45] Jul. 1, 1980

[54] AUTOMATIC SYSTEM AND PROCESS OF SHAPING AND TEMPERING GLASS PIECES

[75] Inventor: Luis Galindez (Aldecoa), Llodio-Alava, Spain

[73] Assignee: Ingenieria Del Vidrio, S.A.-Ingevisa, Vitoria, Spain

[21] Appl. No.: 955,070

[22] Filed: Oct. 26, 1978

[51] Int. Cl.² .................. C03B 23/00; C03B 27/00
[52] U.S. Cl. .................................. 65/104; 65/106; 65/273; 65/245; 65/253; 65/286
[58] Field of Search ............... 65/273, 275, 106, 107, 65/286, 287, 291, 104, 245

[56] References Cited

U.S. PATENT DOCUMENTS

| | | | |
|---|---|---|---|
| 2,223,124 | 11/1940 | Owen | 65/104 X |
| 3,992,181 | 11/1976 | Frank | 65/104 |
| 4,123,246 | 10/1978 | Johnson | 65/273 X |

*Primary Examiner*—Arthur D. Kellogg
*Attorney, Agent, or Firm*—Karl W. Flocks

[57] ABSTRACT

An automatic system and process of shaping and tempering glass pieces comprising reception of a flow of heated glass pieces between upper transverse drive rollers and lower transverse drive rollers, driving and shaping the heated glass pieces between the upper rollers and lower rollers, circulating and deforming the glass pieces alternately between upper and lower positions of the upper and lower rollers, directing an air current upon the glass pieces at the moment the glass pieces circulate in the space between the upper and lower rollers, and discharging the shaped pieces from between the upper and lower rollers.

15 Claims, 8 Drawing Figures

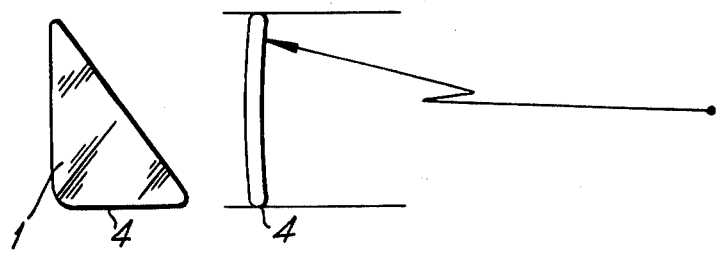
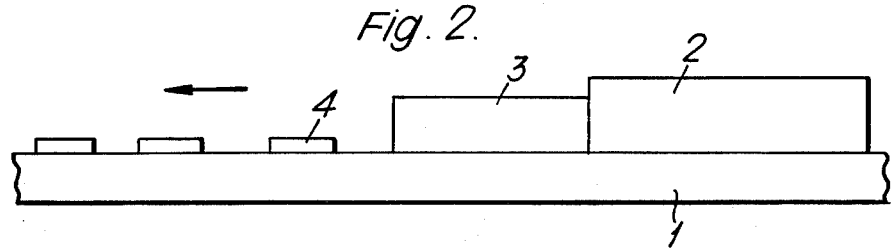
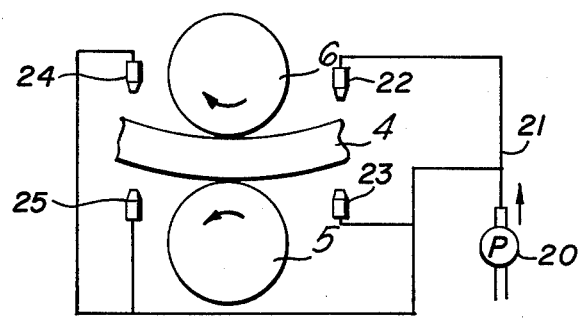
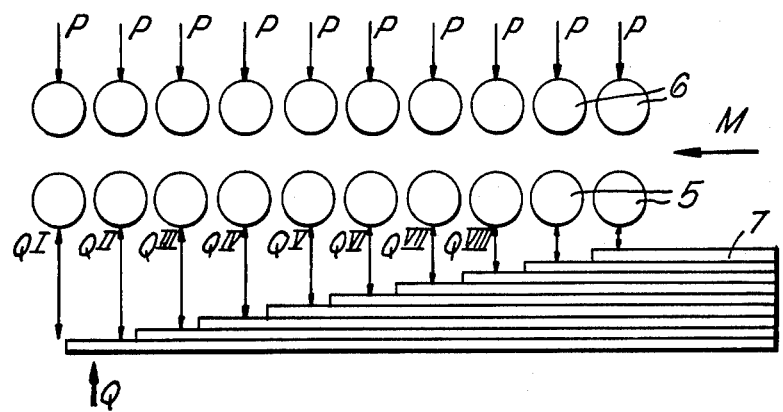

AUTOMATIC SYSTEM AND PROCESS OF SHAPING AND TEMPERING GLASS PIECES

BACKGROUND OF THE INVENTION

1. Field of the Invention

The field of the invention relates to a system and a process for providing curvatures to glass elements or pieces in general, carrying out that operation simultaneously with the tempering procedure of same.

As a non-limitative example of the system's application, the disclosed invention may be used to produce car windscreens, but it must be kept in mind that its ultimate use extends to any type of glass piece which may require shaping and tempering.

2. Description of the Prior Art

With the foregoing in mind, applicant acknowledges that systems are known in which the logical heating stage, as well as that of glass piece shaping, has been simultaneously carried out inside special furnaces, from which the already curved pieces were extracted for the tempering cooling phase in itself. However, these processes produced irregularities in the required curvature, as the already curved and warm pieces underwent said irregularities as regards the shape which was originally sought.

SUMMARY OF THE INVENTION

The invention avoids the classical deficiencies mentioned above by carrying out the piece curvature operation simultaneously to its tempering, maintaining at all times said curvature, without any possibility of alterations in configurations which in all cases adjusts itself to the real shape which is wanted to be reached.

It is thus seen to be an object of this invention to provide a glass piece shaping and tempering system, simultaneously, starting from the glass pieces which have previously been subjected to temperature in an adequate furnace.

Another object of this invention, is that of the constitution of a unit for said shaping and tempering objects, completely independent and even adjustable to any type of heating installation.

Yet another object of this invention is that of the maintenance of this shaping until the end of the process. For this purpose, it can be felt that in some way, it is physically necessary to maintain the curvature of our element during the cooling phase.

The disclosed invention attains the foregoing objects in a conclusive way, precisely shaping the glass element at the cooling state, with its usage being adaptable to any existing process.

In order to stress the advantages of the system disclosed herein, attention is directed to the fact that the tempering and shaping of glass pieces takes place in the above-mentioned unit, therefore as one advantage that can readily be pointed out in advance is that, mechanically, the device for giving the required curvature to the glass elements under consideration and which will later be described, is more simple, due to the fact that it is not subjected to the high temperatures which are prevalent within the furnace, with the parts being more accessible for adjustment and easier to repair.

The process comprises shaping the glass pieces which are received hot, by means of two rows of horizontal, transverse rollers, between which the glass pieces pass through, acquiring the required curvature at the same time they are cooled down by the pertinent air circulation.

The series of lower rollers contacts two longitudinal elements such as leaf springs and by means of synchronized application at their ends of a certain amount of pressure, they acquire the curvature which is transmitted to the lower roller series, with this lower series acquiring a curvature sensibly similar to that of the leaf spring elements and to that required for the glass element to be shaped.

On the other hand, the task of the upper rollers is that of pressing all the surface of the glass piece on the lower rollers, for which the same amount of pressure is carried out upon each one of them, by means of the convenient action of a series of pneumatic cylinders, whose control is well known at the present moment.

As has already been mentioned, a rotating motion is applied to each one of the elements of the two series of horizontal and transverse roller series, in such a way that the glass element will be dragged by the rollers, for which the direction of rotation will be opposite on both series, upper and lower.

The hot glass pieces go to the horizontal device and they are pulled by the movement of the aforementioned rollers, said pieces being continuously shaped, and same being pressed between the rollers.

The efficient length of these rollers will be somewhat greater than that of the curvature generatrix applied on the glass pieces, for avoiding cracks on the sides of the pieces.

The cooling stage of the tempering process is achieved by blowing air on the glass elements, through the gaps that the rollers leave between themselves both on the upper and the lower series.

Briefly, the present invention is for shaping glass elements, by means of an arrangement of two roller rows, with one of them being, the lower one extending perpendicularly between its ends to two strip assemblies of leaf spring shape causes this row to adapt to the required curvature, on application of pressure on its ends, by means of two threaded spindles that can be vertically moved, by means of the movement of an outer handwheel. The row of upper rollers presses the glass piece against the other rollers, with an equal amount of pressure in all its elements by means of pneumatic cylinders or other similar elements.

Both roller rows take the glass piece, pull it and discharge it by means of a conjugated turn of the rollers of both rows, with the work speed being sensibly alike to that of the rest of the installation, in the case of it being carried out so.

This shaping process is simultaneously carried out with the tempering treatment given to these pieces, namely that of cooling, by the subsequent circulation of air on the glass piece, through the gaps that the rollers leave between themselves.

The fundamental characteristics, as well as the advantages of this invention include the following:

1. Glass shaping is carried out outside the furnace, in a completely independent assembly.
2. Shaping is simultaneous with the cooling stage of the applied tempering treatment.
3. The shaping element is simpler in not having to be subjected to the high temperatures which are reached within the furnace.
4. The speed of the whole process can be maintained similar to that of the conveyor belt.

5. It can be used in any operating unit under operation, with only interlocation of the assembly at the furnace outlet being required.

6. The rollers grab, pull and discharge the glass pieces by means of the conjugated turn of the upper row of rollers in relation to the lower one; the movement may or may not depend upon the movement of the conveyor belt of the rest of the process.

Evidently, this automatic glass piece shaping and tempering system, presents not only usefulness in the manufacture of car windscreens, but also in the manufacture of lamps, arcuate or bowed doors, and even for glass pieces curved about more than one generatrix, maintaining in any case the system of upper and lower rollers, simultaneously acting with the cooling stage of the tempering treatment to be necessarily carried out in accordance with the usage characteristics of these glass pieces.

It can even be used in piece shaping which may require curvatures by means of curved-generatrix pseudo-cylindric rollers, being in this case both the roller series with equal curvature and an unlike sign; with the generatrix even being waved or offset, as per requirements.

BRIEF DESCRIPTION OF THE DRAWINGS

In the accompanying drawings forming a part of the disclosure of the present application:

FIG. 1 represents a side view and an end or profile view of a glass element to be shaped by the invention disclosed herein;

FIG. 2 schematically depicts the general process on which the access area over which the system for conducting the disclosed process is located and the work pieces are received for processing thereby;

FIG. 3 is a schematic representation of one roller from each of a pair of series of rollers constituting the disclosed invention;

FIG. 4 represents the layout of a plurality of strips operatively associated with a lower roller series as well as the alignment with an upper roller series;

DETAILED DESCRIPTION OF THE INVENTION

Figure 5:
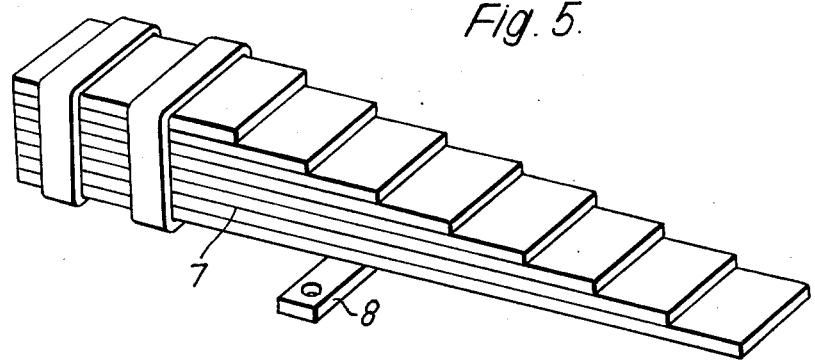
FIG. 5 represents a view in perspective of a strip spring layout similar to that in FIG. 4, but with means adapted to be operably associated with a lower roller.
Figure 6:
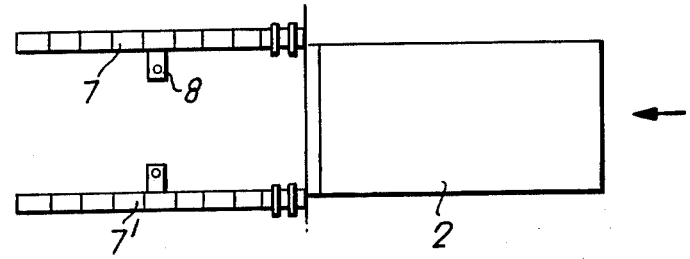
FIG. 6 represents a schematic layout of the strip spring assemblies at the outlet of an access area of the disclosed invention.
Figure 7:
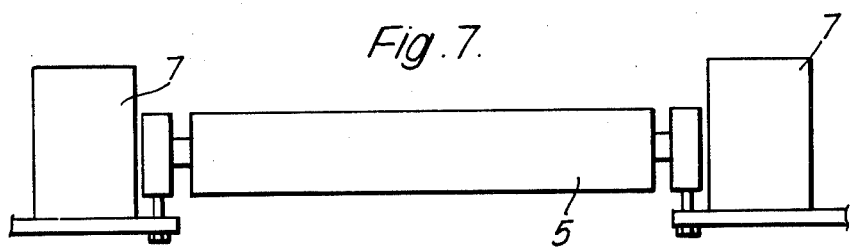
FIG. 7 shows a possible location of a lower roller on two strip spring assemblies.

Referring now to the drawings in detail the reader will readily observe that in accordance with the invention disclosed herein how the glass piece on the left of FIG. 1 can be shaped so as to include the arcuate profile in the right or end view thereof in FIG. 1 according to the disclosed invention. Considering FIGS. 2–4 then the reader will appreciate that the process according to the present invention may include an access area 2 provided with lower roller series 5 and upper roller series 6 for shaping and tempering glass pieces 4. As can be visualized in FIG. 3 rollers 5 and 6 of each series shape and drag the glass piece 4 in the area 3. The layout of strips 7 in FIG. 4 is to be understood to be part of an assembly operably associated with the roller series 5 contacted therewith, for example, and in alignment with the series of upper rollers 6. The strips 7 may, for example, be leaf springs with a mounting element 8 bound thereto at the lower part of leaf spring 7 where a series of lower rollers 5 contact. The arrangement is further to be understood to include such mounting elements 8 along the length of the lower strip 7 as a function of the number of rollers 5 or 6 forming each series. At the outlet of the access area 2 two strip assemblies 7, 7' can be seen in FIG. 6 to be spaced-apart from each other. Possible location of each lower roller 5 of one series is shown to be in an area between two strip assemblies 7 and 7'. The way in which manual pressure can be applied on the ends of both strip assemblies 7 and 7' can be appreciated from FIG. 8 as being obtainable through spindles 14, shaft 10, and the action of handwheel 9.

Means for directing currents of air on the heat glass piece 4 at the moment such glass piece 4 traverses the space between upper and lower rollers 6 and 5, respectively, may be effected by a pump 20 connected at its output to a circuit 21 with outlet nozzles 22,23,24,25. Nozzles 22 and 23 direct currents of cooling air on the upper and lower surfaces, respectively, of glass work piece 4 prior to its passage between rollers 5,6 and nozzles 24 and 25 direct currents of cooling air on the upper and lower surfaces of glass work piece 4 after its passage from between rollers 5,6. Other systems for directing currents of cooling air against the glass work piece 4 than that illustrated and described herein may be employed within the scope of the inventive concept.

Figure 8:
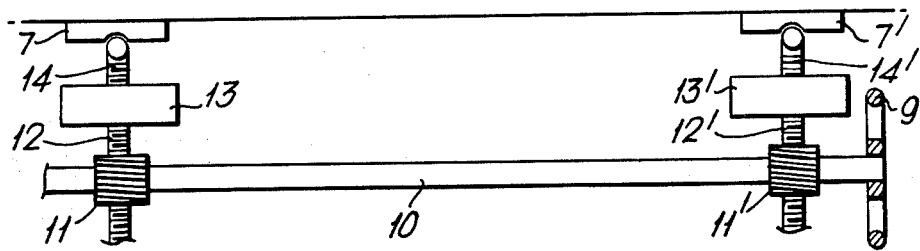
FIG. 8 shows an arrangement whereby manual pressure may be applied on the ends of two strip spring assemblies.

As may be readily appreciated from FIG. 8 rotation of handwheel 9 will actuate shaft 10 which in turn by way of toothed or threaded members 11 and 11' will effect rotation of spindles 12 and 12' on their shafts 14 and 14' since the latter are in meshing relationship with members 11 and 11'. Spindles 12 and 12' are further to be understood as being in threaded relationship with stationary elements 13 and 13' which are secured on a fixed bed member, whereby rotation of handwheel 9 will further impart vertical motion to spindles 12 and 12' and as spindles 12 and 12' are in contact with strips of both assemblies 7 and 7', the radii of curvature of assemblies 7 and 7' can be varied as on a leaf spring.

With the manner in which the lower series of transverse rollers 5 are fastened to assemblies 7 and 7' by elements 8 in mind the reader will readily appreciate that the curvature of assemblies 7 and 7' is transmitted directly to the lower series of rollers 5 illustrated schematically in FIG. 4. The method of movement transmission from one roller to another of each series, as well as between both series, can be carried out either by a chain with its adequate tensors or it can either be of any type, even a hydraulic type, etc.

It is to be kept in mind that the pressure carried out upon each roller is applied upon the ends of same, with which the equalness of the pressure carried upon the glass is guaranteed, both by means of the upper and lower series.

It is also to be kept in mind that the curvatures to be carried out must be of at least 105 mm, an aim which this invention broadly covers.

To apply the concept of the present invention on processes that are already in use, it would suffice by inter-locating device according to the present invention in the existing chain, for which, it would only be practically necessary to cut the conveyor belt. For different sizes of glass pieces it will be necessary to replace the rollers with other longer ones, without need for the changing the leaf spring-like strip assemblies, as the roller series can be placed at the top and the bottom and at the same height of the strip assemblies, with only changing the fastening means of the rollers to leaf spring shaped strips be needed.

It will be obvious to those skilled in the art that various changes may be made without departing from the scope of the invention and therefore the invention is not limited to what is shown in the drawings and described in the specification but only as indicated in the appended claims.

What is claimed is:

1. A process for automatically shaping and tempering glass pieces comprising in combination:
   (a) receiving heated glass pieces;
   (b) inserting the heated glass pieces between an upper series and a lower series of transverse drive rollers, driving and shaping the heated glass pieces between alternate rollers of the two series;
   (c) simultaneously directing currents of cooling air on the heated glass pieces at the moment such glass pieces traverse the space between the upper and lower rollers to thereby temper the glass pieces; and
   (d) discharging the shaped glass pieces from between the rollers.

2. The process as defined in claim 1 including use of motion of the transverse drive rollers to cause the heated glass pieces to pass between the upper and lower transverse drive rollers and thereby obtain the curvature of the rollers while simultaneously in the process of being cooled, shaped, and permanently tempered by a cold current of air directed thereon.

3. The process as defined in claim 2 characterized in that the transverse drive rollers are disposed in two groups, namely a lower group and an upper group with each roller in the lower group being in vertical alignment beneath a roller in the upper group at a distance slightly greater than the width or thickness of a glass piece to be processed therebetween and means are provicded to adjustably support both the upper and lower rollers whereby the relative position of the rollers may be displaced until a curved shaped bed component is constituted upon which glass pieces may be passed over.

4. The process as defined in claims 1, 2 or 3 comprising the step of providing a constant amount of pressure from each roller of the upper group in the direction of corresponding rollers of the lower groups with pneumatic cylinders furnishing the pressure to shaft portions on the ends of the upper rollers.

5. The process as defined in claim 3 including the step of mounting the lower rollers on end supports projecting laterally from elongate strips placed in the direction or path of travel of the glass pieces.

6. The process as defined in claim 5 including the steps of providing that said strips are a base and additional strips of equal width are superposed on said strips with each of the additional strips being shorter in length than the strip immediately therebeneath and with all such strips starting at the reception area and being bound together thereat by clamps or like fasteners.

7. The process as defined in claim 6 including the steps of providing that free ends of the lower strips of each lateral group, are actuated by ends of threaded spindles mounted inside bushings which are also threaded, the bushings being fastened to a chassis of the installation, in such a way that said spindles are actuated at the same time by another threaded spindle which is perpendicular to them, the latter being moved by means of a handwheel which can be actuated from the outside.

8. The process as defined in claim 7 including the step of providing for impingement of the spindles upon the ends of the bigger strips to determine the attainment of curvature in said strips and consequently on the lower rollers connected through their supports upon those, later proceeding to adjust the upper screws in relation to the lower ones at a convenient distance.

9. The process as defined in claim 8 including the step of providing that the curvature of the roller groups greatly correspond to the resultant curvature of the glass piece.

10. The process as defined in any one of claims 1, 2, or 3 and further including the step of providing that the operating speeds of the upper and the lower rollers are closely similar to the speed of the glass pieces arriving at the receiving area.

11. The process as defined in any one of claims 1, 2, or 3 and further including the step of providing that the upper and the lower rollers are driving either due to being moved by independent units or by obtaining movement of the general installment.

12. An automatic apparatus for simultaneously shaping and tempering heated glass pieces comprising in combination an upper series of transversely extending drive rollers, a lower series of transversely extending drive rollers in generally vertical alignment with the upper series of rollers, means in the form of elongate spring strips supporting the lower series of rollers, means for applying pressure to said upper rollers toward said lower rollers, means for varying curvature of the spring strips and thus the vertical location of the lower rollers whereby the location of the upper and lower rollers may assume a curve shaped bed to shape a glass piece, the space between the upper and the lower rollers being on the order of the thickness of a glass piece to be shaped thereon and to facilitate projection of air currents on the glass piece passing in the space between the upper and lower rollers.

13. The system as defined in claim 12 including in combination therewith means for directing a cold air current on the pieces being shaped to temper same.

14. The system as defined in claim 12 including in combination therewith a reception area ahead of the upper and lower rollers for receiving incoming heated glass pieces.

15. The system as defined in claim 12 wherein said upper and lower rollers are effectively driven whereby glass pieces therebetween will be pulled therethrough and shaped.

* * * * *